United States Patent [19]

Kunert

[11] Patent Number: 4,876,132
[45] Date of Patent: Oct. 24, 1989

[54] METHOD AND APPARATUS FOR INSTALLING AUTOMOBILE GLAZING

[75] Inventor: Heinz Kunert, Cologne, Fed. Rep. of Germany

[73] Assignee: Saint-Gobain Vitrage, Courbevoie, France

[21] Appl. No.: 216,926

[22] Filed: Jul. 8, 1988

[30] Foreign Application Priority Data

Jul. 9, 1987 [DE] Fed. Rep. of Germany ....... 3722657

[51] Int. Cl.⁴ .............................................. E06B 7/00
[52] U.S. Cl. ....................................... 428/43; 52/208;
156/108; 156/244.12; 156/293; 156/500;
296/84.1; 428/192
[58] Field of Search ................... 156/108, 244.12, 293,
156/500; 52/208; 296/84.1; 428/43, 157, 192

[56] References Cited

U.S. PATENT DOCUMENTS 4,581,276  4/1986  Kunert et al. .................. 156/108 X Primary Examiner—Robert A. Dawson
Attorney, Agent, or Firm—Pennie & Edmonds

[57] ABSTRACT

A process is described for installing an automobile glazing by direct gluing in which an extrusion nozzle deposits an adhesive mass in bead form on one of two surfaces to be glued. The bead can either be used directly for gluing or, after hardening, act as a profile placed on glazing which is used as an intermediary between the glazing and a second gluing bead. Embedded within the bead are a plurality of high tensile strength flexible wires. During the removal of the glazing the wires are used to shear the bead where they have been introduced, i.e., either in profile or in the second gluing bead. The wires are positioned so that each has to shear only a part of the section of profile or of the bead.

16 Claims, 4 Drawing Sheets

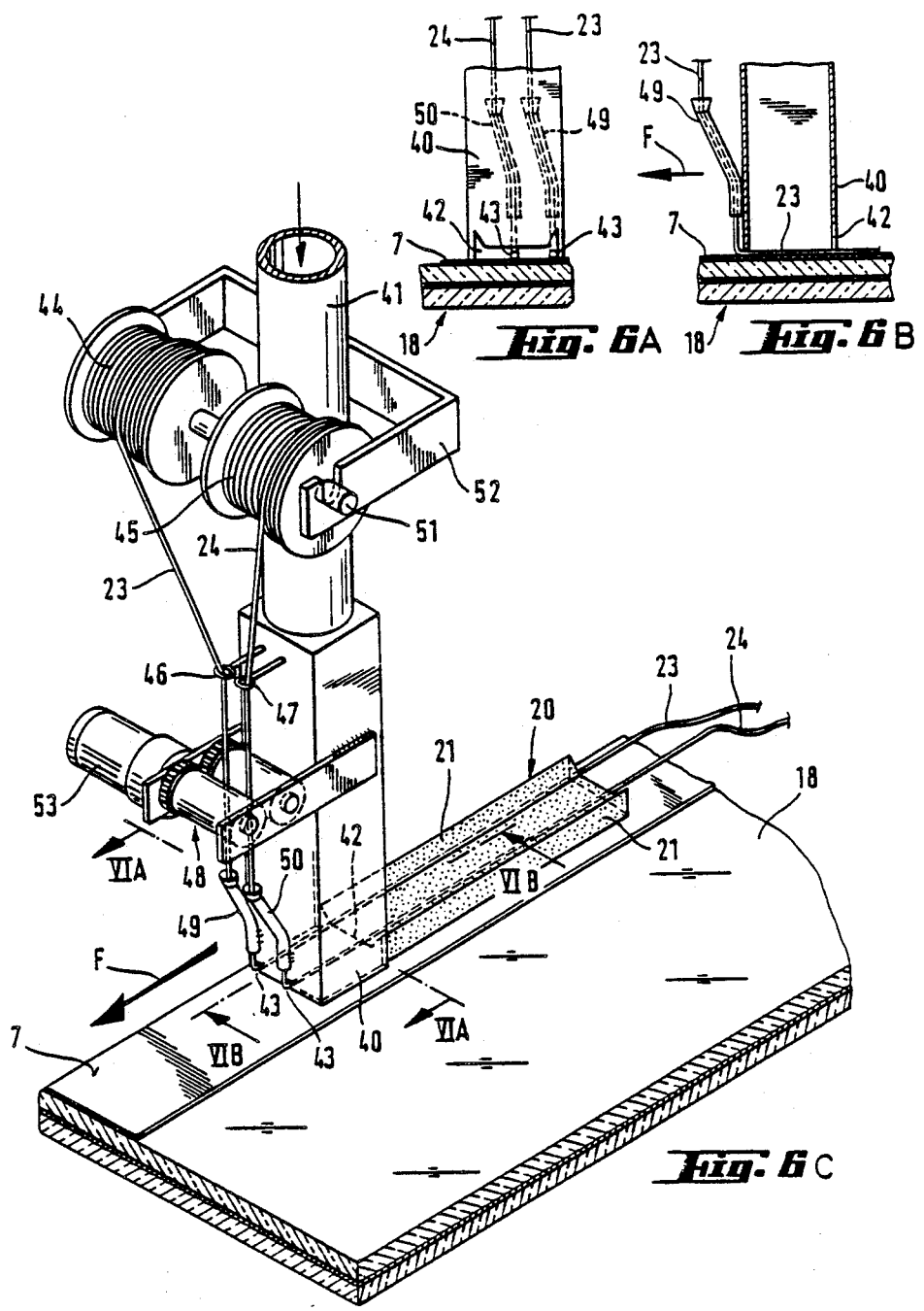

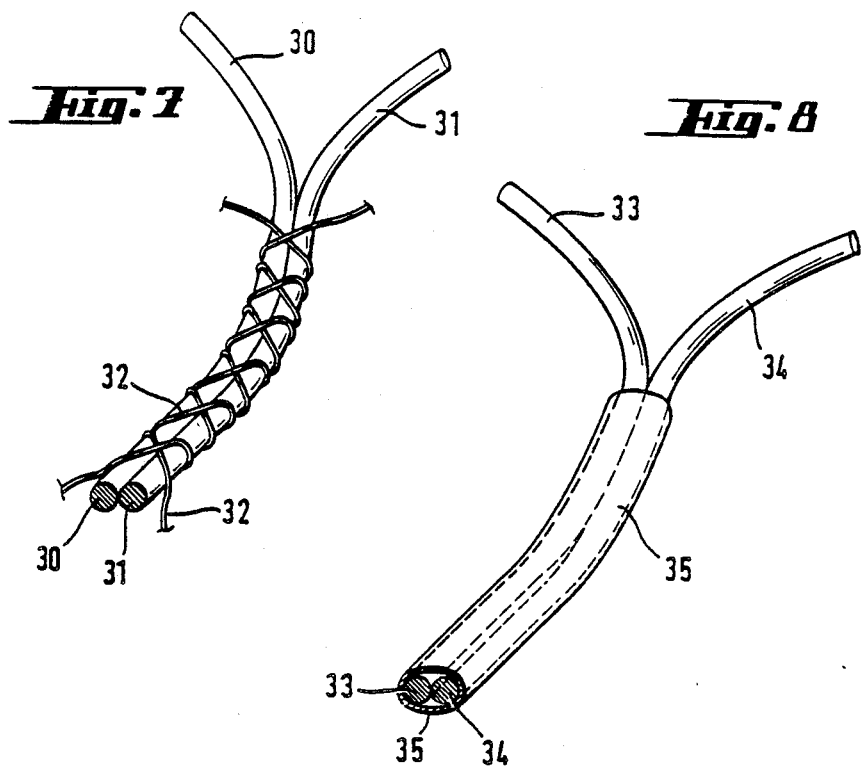
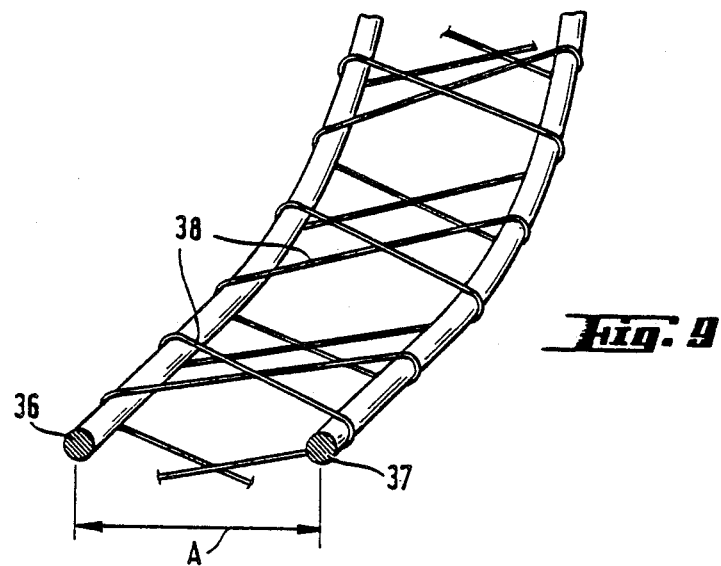

4,876,132

METHOD AND APPARATUS FOR INSTALLING AUTOMOBILE GLAZING

BACKGROUND OF THE INVENTION

This invention relates to a process for gluing an automobile windshield into its bay or opening by simultaneously extruding through a nozzle an adhesive mass in bead form and a flexible high tensile wire. The bead acts immediately as a glue or, after hardening, as a bead of interlayer between the glazing and another bead of glue. The wire is used for the shearing of the adhesive bead during a possible later removal of the glazing.

In a known installation method, the bead of glue is deposited on the edge of the glazing and a flexible wire is placed either in the core of the bead or in its immediate vicinity (European patent application No. EP 0 121 480). In this known process, to remove the glazing from the vehicle, the flexible wire must cut across the entire width of the strip of glue in order to shear the adhesive. Because the materials which make up the glues exhibit great rigidity or hardness when dry, enormous shearing stresses are required to shear the material over its entire width. These shearing stresses cause great tensile stresses in the wire. As the tensile forces increase, the risk of exceeding the breaking load of the wire increases, which would result in a fractured wire. When the wire is placed along the bead on the inside of the glazing and the wire is pulled from the outside of the vehicle, this risk is particularly great. In this case, the wire is pulled under especially delicate conditions when it passes around the edge of the glass such that there is considerable risk of the wire being broken.

To increase the strength of the wire, an obvious alternative is to increase the wire's diameter. However, such a measure causes drawbacks which prevent obtaining the desired result. Increasing the diameter diminishes the cutting characteristics of the wire. Therefore, increasing the diameter of the wire necessitates exerting greater tensile forces to shear the bead. However, since the forces needed to shear the bead increase faster than the tensile strength of the wire, the use of wire of greater diameter does not solve the existing problem.

Therefore, the objective of the invention is to reduce the tensile forces needed to shear the glue bead, thereby facilitating the removal of the glazing while diminishing the risks of breaking the wire.

SUMMARY OF THE INVENTION

In the present invention, I have devised a process for installing automobile windshields which requires less tensile force to shear an adhesive bead when removal is desired. This process introduces into the bead, and deposits with its, at least two flexible wires positioned such that each of the wires shears only a part of the bead during the removal of the glazing.

The tensile force needed to break the bead of glue depends on the width of the bead. Because of the adhesion needed to attach the windshield, a reduction in the width of the bead is an unacceptable solution. Instead, the invention reduces the width of bead sheared by using not one but two or more wires placed in substantially the same plane. When shearing is desired, the wires are pulled separately or together in a direction nearly perpendicular to the bead and in approximately the same plane as that of the wires. In this ways, the shearing surface produced by the pull on one of the wires is continued by the shearing surface produced by the neighboring wire. The result is an approximately flat separation surface through the entire width of the bead consisting of the juxtaposition of two or more separation surfaces each corresponding to the action of one of the wires.

The process according to the invention is compatible with methods of direct gluing a glazing to an opening. Just before placing the glazing in the body opening, a gluing bead and its wire are simultaneously applied either directly on the fastening sheet metal piece, or on the edge of the glazing. The shearing wires are inserted in the single bead of glue which adheres the glazing to the opening.

In a more favorable method, instead of direct gluing the invention initially allows a layer of glue to harden on the glazing. This layer acts as an interlayer between the glazing and a cohesive bead of glue which binds the glazing to the opening. The flexible wires are positioned either in the hardened interlayer on the glazing, or in the cohesive bead of glue.

Advantageously, the interlayer is deposited in the form of a U-shaped cross section. The cohesive bead of glue is deposited in the channel formed in the U-shaped cross section when the glazing is installed. Unlike the cohesive head of glue whose width depends on the pressure exerted on the glazing at the time of installation, the interlayer keeps its original dimensions because it hardens undisturbed. Therefore, since the position of the flexible wires can be predetermined in the interlayer, it is advantageous to place them there instead of in the cohesive layer of glue.

As in the known process where a single wire shears the bead of glue, the inventive process requires that when the glazing is removed the end of the wires be guided laterally toward the outside of the bead of glue where they are easily grasped. Ordinary means are used to exert the pull on the wires during removal, such as, for example, a mechanical winding system which rests on the glazing itself or on the body. This system allows both the wires to shear in the desired direction perpendicular to the bead of glue and also to gauge the tensile forces on the wire.

BRIEF DESCRIPTION OF DRAWING

These and other objects, features, and advantages of the present invention will be more readily apparent from the following detailed description of a preferred embodiment of the invention in which:

FIGS. 6A, 6B and 6C depicts a device for depositing a bead of glue on a glazing according to FIG. 3; and FIGS. 7 to 9 depict three different examples of double wires to be simultaneously deposited with a bead of glue.

DETAILED DESCRIPTION OF PREFERRED EMBODIMENT

Figure 1:
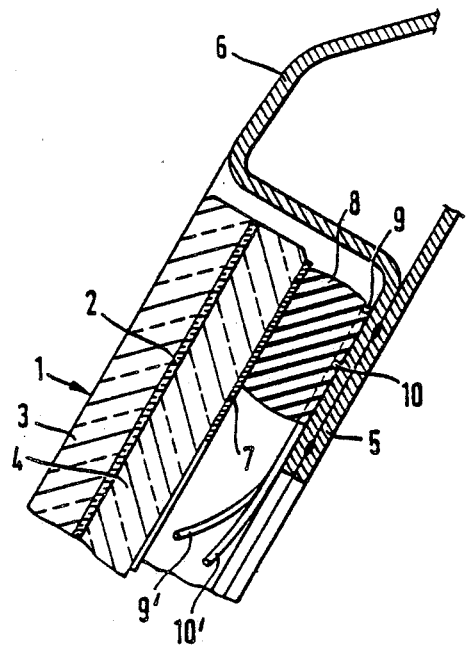
FIG. 1 depicts a first illustrative embodiment of the invention in which a bead of glue is deposited on the edge of the opening with two wires embedded therein.

In the drawings windshield 1 is depicted each time as a laminated glazing consisting of two-lime-silica glass sheets 3, 4 joined together by a thermoplastic interlayer 2. This combination can be replaced either by a monolithic windshield or by a different kind of laminated windshield. Similarly, the flexible wires shown are single strand wire but filament wire can be substituted.

A frame-shaped, ceramic or polymer opaque pigment layer 7 is deposited along the perimeter of windshield 1 on the side of the glazing opposite a fastening sheet metal piece 5 in an opening in an automobile body frame 6. This layer functions as a decorative frame, preventing the gluing area from being seen through windshield 1. It also promotes adherence between a bead of glue 8 and the surface of the glass and protects bead 8 from the action of ultraviolet rays. The connection between windshield 1 and fastening sheet metal piece 5 is provided by bead 8. A composition of the glue of bead 8 is adapted to maximize bonding, such as, for example, butyl rubber or polyurethane. Polyurethane can be a singlecomponent system that hardens in moisture, or else a bicomponent system.

Bead of glue 8 is deposited on fastening sheet metal piece 5 immediately before mounting windshield 1 in the automobile body frame 6. A device, described later using FIG. 6, is used to deposit the bead. Two flexible wires 9 and 10 are placed on sheet 5 as bead 8 is deposited. Wire 9 is positioned on the outer edge of bead 8. Wire 10 is located approximately in the middle of the contact surface between bead 8 and sheet 5. Ends 9', 10' of the two wires 9 and 10 pass through bead 8 and rejoin at the edge of the opening so they can be grasped when the windshield needs to be removed. The ends are marked individually to be identified as belonging either to outer wire 9 or middle wire 10. During removal of windshield 1, middle wire 10 is pulled first, then outer wire 9.

Figure 2:
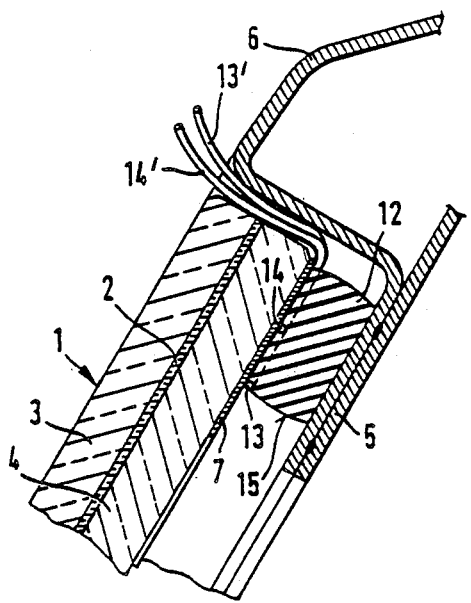
FIG. 2 depicts a second illustrative embodiment of the invention.

FIG. 2 is an embodiment of the invention where the gluing of windshield 1 on fastening sheet metal piece 5 is performed using a bead of homogeneous glue. This time, just before mounting windshield 1 in the opening, bead of glue 12 is placed on the perimeter of windshield 1. Again, a nozzle extrudes the bead 12 either directly on the surface of the glass or on opaque layer 7. The extrusion and depositing of bead 12 is performed as above using an extrusion device shown in FIG. 6. Here also, wires 13, 14 are either incorporated directly in bead 12 or placed in its immediate vicinity. Wires 13, 14 are positioned such that each has to shear only half the section of bead 12. To do this, wire 13 is located in the corner formed by the inner surface of windshield 1 and inner edge 15 of bead 12. Wire 14 is positioned in the middle of the contact surface between bead 12 and the surface of windshield 1. This time, ends 13' and 14' of wires 13 and 14 are directed toward the outside where they will remain in a slot between the outer edge of the windshield and the frame of the opening. During the removal process, they are removed from this slot and are grasped from the outside of the body. The ends are marked individually to be identified as belonging either to inner wire 13 or middle wire 14. To shear bead 12, wire 14, placed in the middle of the bead, is pulled in a suitable direction; then, wire 13 is pulled.

Figure 3:
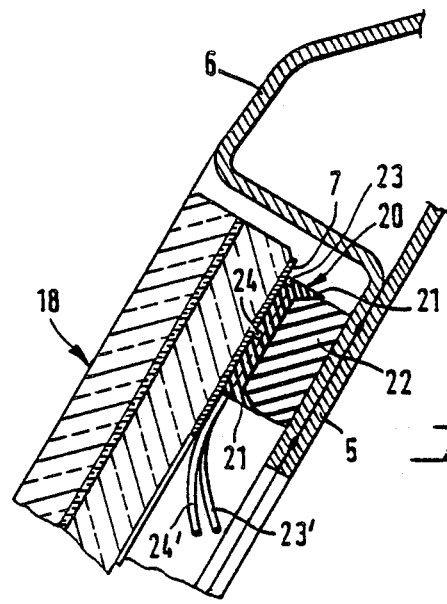
FIG. 3 depicts a third illustrative embodiment of the invention.
Figure 4:
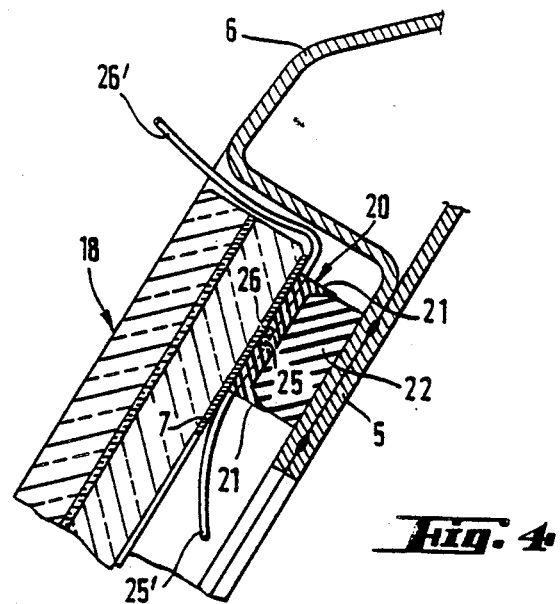
FIG. 4 depicts a fourth illustrative embodiment of the invention.
Figure 5:
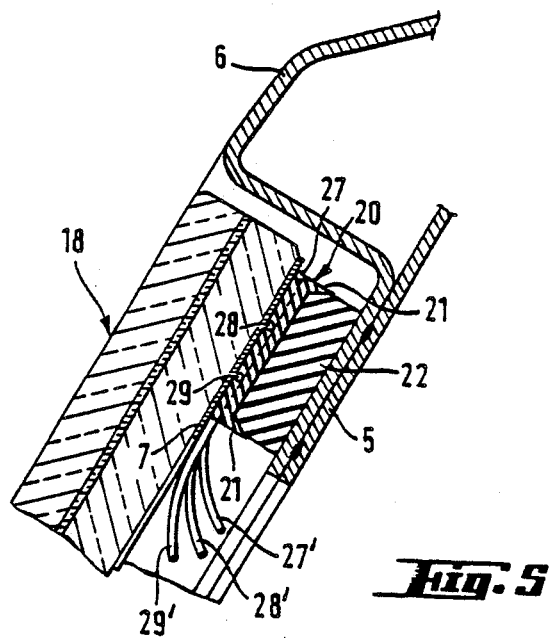
FIG. 5 depicts a fifth illustrative embodiment of the invention.

The embodiments of the invention exhibited in FIGS. 3 to 5 are different from those exhibited so far in that windshield 18—before it is mounted, for example just after it is made—is equipped with an extruded profile bead 20. Bead 20 is used as a support for a second bead of glue 22 which secures the windshield to the fastening sheet metal piece when the windshield is mounted in the body. The advantage of this embodiment is a simplified production phase on the automobile assembly line. Several phases are performed in advance of actual assembly, i.e., the cleaning of the surface of the glass on its periphery, the depositing of an primer on the surface of the glass and the operations necessary to deposit the flexible wires intended to shear the bead. The only operation during assembly is the deposition of bead of glue 22 which is responsible for the gluing itself. This bead is deposited either on the side of the windshield on hardened profile bead 20 or else on fastening sheet metal piece 5.

Profile bead 20 comprises a hardened adhesive mass. It must be compatible and adhere completely to the glue used for bead 22. Accordingly, profile bead 20 should have either the same or similar chemical composition to bead 22. Single-component polyurethane glues that harden in moisture or bicomponent polyurethane glues, among others, is suitable.

The profile bead is deposited by an extrusion nozzle such as the one shown in FIG. 6. The section of this bead 20 is U-shaped. The two legs of the U limit laterally the expansion of bead 22 during the mounting of the windshield. FIG. 3 shows two wires 23 and 24 introduced during the extrusion of first profile bead 20. Flexible wire 23 follows the groove or recess consisting of outside leg 21 of the U and the surface of the glass. Wire 24 is placed in the middle of the contact surface between profile bead 20 and, either the glass surface, the opaque layer 7 or the layer of primer if its exists. The two ends 23' and 24' of wires 23 and 24 pass from the end of the profile bead 20 on the inner side of the windshield 18 and are identified as inside and outside wires, respectively. To remove windshield 18, wire 24 is pulled first, then wire 23, thereby slicing profile bead 20 in two successive stages.

FIG. 4 shows a connection comparable to FIG. 3. However, in contrast to FIG. 3, the two wires 25 and 26 are next to one another either in the middle of the contact surface between bead 20 and the glazing or in the middle of profile bead 20 itself. In this case, end 25' of wire 25 is located on inner side of bead 20, and end 26' of wire 26 is located on the outer side of this same bead. To remove windshield 18, wire 25 is pulled from bead 20 from the inside of the windshield while wire 26 is pulled from the outside.

In FIG. 5, an embodiment shows windshield 18 equipped with a profile bead 20 into which flexible wires 27, 28 and 29 are introduced. While wire 27 is placed along the groove between the outside surface of leg 21 of the U and the adjacent surface of glazing 18, the two other wires 28 and 29 are distributed in the section of profile bead 20 so that each of the three wires is concerned with a third of the section of the profile. Ends 27', 28', and 29' of the three wires come out of profile bead 20 on the inner side of the windshield. When windshield 18 must be removed, wire 29 will first be removed from profile bead 20. It will then be the turn of middle wire 28, then finally of outer wire 27.

FIG. 6 shows a device which simultaneously deposits a bead of glue and two flexible wires. In the example shown, the device deposits on the perimeter of windshield 18 profile bead 20 in a U shape bounded by two legs 21 of the U. The device comprises a square tube nozzle 40 which ends in a round tube 41. Tube 41 is fed by a high pressure pipe, not shown. This pipe is connected to a pumping system, also not shown, which brings the adhesive mass under pressure up to nozzle 40.

At its lower end, nozzle 40 is open. It has a calibrated lateral opening 42 on the side opposite the direction of movement F. The adhesive mass is expelled from this orifice to deposit a bead with a suitable cross-section.

Wires 23, 24 are introduced into the bead from the opposite side of lateral opening 42 of extrusion nozzle 40 through passages 43. Wire 23 is fed from a reel 44 and wire 24 from a reel 45. The wires 23, 24 are conducted from the reels by guides 46 and 47 to a pair of drive rollers 48 to tubular guides 49 and 50. Two supports 51 and 52 of supply reels 44 and 45, guides 46 and 47 and the pair of drive rollers 48 are connected to nozzles 40 and 41. Rollers 48 are driven by motor 53 at a speed corresponding to the movement speed of the nozzle in the direction of arrow F. The other elements of the process for depositing the profile bead are the same as those in the European patent application published under No. EP 0 121 480.

Generally, the flexible wires are made from a suitable metal. However, wire materials other than metals which are characterized by high tensile strength in small cross-sectional diameters can be used.

Each of the flexible wires can be incorporated separately into the adhesive mess. However, the procedure is simplified if the two wires are deposited simultaneously. To facilitate this procedure, various devices are used to join the wires as shown in FIGS. 7, 8 and 9. FIG. 7 shows a double wire where the two strands 30 and 31 are placed side by side and united using fine wires 32. The breaking strength of fine wires 32 is relatively small so they easily break when the flexible wires are removed individually from the profile bead. The same holds for the device in FIG. 8 where, instead of the fine wire, the two wires 33, 34 are surrounded by a frangible sheath 35. To prevent the two flexible wires 33, 34 from being removed from sheath 35, they are glued to its inside, or the opposite ends of the two wires 33 and 34 are connected to the adhesive mass. These two double-wire systems are suited to the embodiment of the configuration exhibited in FIG. 4.

Similarly, the two flexible wires may be joined when they must remain parallel but separate from one another as is the case in FIGS. 1 and 3. For example, as shown in FIG. 9, two single wires 36 and 37 separated by desired distance A corresponding to the halfwidth of the profile bead or of the bead producing the gluing are joined by a frangible wire 38.

What is claimed is:

1. A process for installing an automobile glazing into an opening by depositing between the glazing and the opening an adhesive mass in bead form and a plurality of high tensile strength wires for shearing said bead, said wires being adapted to shear different parts of said bead, at least some of said wires being embedded in said bead.

2. The process of claim 1 wherein the bead of an adhesive mass is deposited on one of two surfaces to be glued and the high tensile strength wires are placed simultaneously with the bead, either in the core of the bead or in its immediate vicinity, wherein the bead acts as a glue or, after hardening, as an interlayer bead between the glazing and another bead of glue, and during removal of the glazing, the wires shear the bead;

wherein at least two wires are introduced into the bead, deposited with it, and positioned in the section of the bead so that during the removal of the glazing each of the wires has to shear only a part of the section of the bead.

3. The process of claim 2 wherein said wires comprise at least an inner wire and an outer wire which are placed next to one another in the middle of the width of the bead of glue, and, as they exit from the bead, at least one of the ends of the outer wires is conducted toward the outside and at least one of the ends of the inner wire is conducted toward the inside of the vehicle.

4. The process of claim 3 wherein a plurality of single wires are joined with one another by a frangible means so that installation of these wires in the adhesive mass is simplified and the wires are easily broken apart during their removal from the bead.

5. The process of claim 1 wherein the flexible wires are placed at a given distance from one another one wire follows a recess defined by a first lateral surface of the bead of glue and a surface of the glazing, at least one of the ends of each of the wires is conducted through the bead to a second lateral surface of the bead opposite said first lateral surface of the bead, and the ends are identified to help determine the order the different wires are removed from the bead.

6. The process of claim 5, wherein a plurality of single wires are joined with one another by a frangible means so that installation of these wires in the adhesive mass is simplified and the wires are easily broken apart during their removal from the bead.

7. The process of claim 1 wherein a plurality of single wires are joined with one another by a frangible means so that installation of these wires in the adhesive mass is simplified and the wires are easily broken apart during their removal from the bead.

8. A device for embedding a plurality of flexible wires in a bead of glue comprising an extrusion nozzle (40) having a calibrated opening (42) to deposit an adhesive mass with high viscosity, at least two passages (43) each of which conducts a flexible wire (23, 24) into the adhesive mass, and at least two tubular guides (49, 50) each of which feeds a wire (23, 24) into one of said passages.

9. An automobile glazing intended for direct gluing comprising on its edge a profile bead (20), in which at least two flexible wires (23, 24, 25, 26, 27, 28, 29) are located at different positions in said bead with ends that exit laterally from said bead, said wires being adapted to shear different parts of said bead, whereby by pulling successively on the ends of said wires, said wires are used to shear said bead.

10. A process for installing an automobile glazing into an opening by depositing between the glazing and the opening an adhesive mass in bead form and a plurality of separate high tensile strength wires for shearing said bead, said wires being parallel to each other and to said bead and being adapted to shear different parts of said bead, at least some of said wires being embedded in a cross-section of said bead.

11. The process of claim 10 wherein the bead of an adhesive mass is deposited on one of two surfaces to be glued and the high tensile strength wires are placed simultaneously with the bead, either in the core of the bead or in its immediate vicinity, wherein the bead acts as a glue or, after hardening as an interlayer bead between the glazing and another bead of glue, and during removal of the glazing, the wires shear the bead, wherein at least two wires are introduced into the bead, deposited with it, and positioned in the section of the bead so that during the removal of the glazing each of the wires has to shear only a part of the section of the bead.

12. The process of claim 11 wherein said wires comprise at least an inner wire and an outer wire which are placed next to one another in the middle of the width of the bead of glue, and, as they exit from the bead, at least one of the ends of the outer wire is conducted toward the outside and at least one of the ends of the inner wire is conducted toward the inside of the vehicle.

13. The process of claim 12 wherein said plurality of separate wires are joined with one another by a frangible means so that installation of these wires in the adhesive mass is simplified and the wires are easily broken apart during their removal from the bead.

14. The process of claim 10 wherein said separate wires are placed at a given distance from one another, one wire follows a recess defined by a first lateral surface of the bead of glue and a surface of the glazing, at least one of the ends of each of the wires is conducted through the bead to a second lateral surface of the bead opposite said first lateral surface of the bead, and the ends are identified to help determine the order the different wires are removed from the bead.

15. The process of claim 14 wherein said plurality of separate wires are joined with one another by a frangible means so that installation of these wires in the adhesive mass is simplified and the wires are easily broken apart during their removal from the bead.

16. The process of claim 11 wherein said plurality of separate wires are joined with one another by a frangible means so that installation of these wires in the adhesive mass is simplified and the wires are easily broken apart during their removal from the bead.

* * * * *